(12) United States Patent
Chen et al.

(10) Patent No.: US 9,924,044 B2
(45) Date of Patent: Mar. 20, 2018

(54) RECOMMENDATIONS BASED ON REAL-TIME USAGE INFORMATION

(75) Inventors: Xuming Chen, San Ramon, CA (US); Lindsay Notwell, Columbus, OH (US); Phillip A. Ritter, Danville, CA (US); Barry F. Hoffner, Bridgewater, NJ (US); Imtiyaz Shaikh, Irving, TX (US); Sergei Karpov, Concord, CA (US); Ho Yin Cheuk, Bridgewater, NJ (US); Javier Ferro, Somerset, NJ (US); John C. Powell, Marysville, OH (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 1152 days.

(21) Appl. No.: 13/009,976

(22) Filed: Jan. 20, 2011

(65) Prior Publication Data

US 2012/0191536 A1    Jul. 26, 2012

(51) Int. Cl.
*H04M 15/00* (2006.01)
*G06Q 30/02* (2012.01)
*G06Q 30/04* (2012.01)
*G06Q 40/00* (2012.01)

(52) U.S. Cl.
CPC ............ *H04M 15/00* (2013.01); *G06Q 30/02* (2013.01); *G06Q 30/0251* (2013.01); *G06Q 30/04* (2013.01); *G06Q 40/12* (2013.12)

(58) Field of Classification Search
USPC .................................................. 379/114.01
See application file for complete search history.

(56) References Cited

U.S. PATENT DOCUMENTS

| 5,892,900 A * | 4/1999 | Ginter et al. .................. 726/26 |
| 7,065,492 B2 * | 6/2006 | Cinquini et al. ............... 705/60 |
| 2002/0154751 A1 * | 10/2002 | Thompson et al. ..... 379/114.01 |
| 2006/0143027 A1 * | 6/2006 | Jagannathan et al. ............ 705/1 |
| 2008/0052206 A1 * | 2/2008 | Edwards et al. ................ 705/34 |
| 2010/0188995 A1 * | 7/2010 | Raleigh ........................ 370/252 |
| 2011/0208668 A1 * | 8/2011 | Phillips ........................ 705/347 |
| 2011/0246526 A1 * | 10/2011 | Finkelstein et al. ........... 707/784 |
| 2013/0078985 A1 * | 3/2013 | Savolainen et al. .......... 455/418 |

OTHER PUBLICATIONS

Antonis Hontzeas, Long Term Evolution (2009),http://considerations.wordpress.com pp. 3,4.*

* cited by examiner

*Primary Examiner* — Tsan-Yu J Huang

(57) ABSTRACT

A method including receiving a request for a service or an application from a user device associated with a customer; determining a type of service or a type of application; providing the service or the application; performing real-time tracking of the customer's usage of the service or the application based on the type of service or the type of application; generating one or more recommendations pertaining to the service or the application based on the real-time tracking; and sending the one or more recommendations to the customer via the user device.

17 Claims, 11 Drawing Sheets

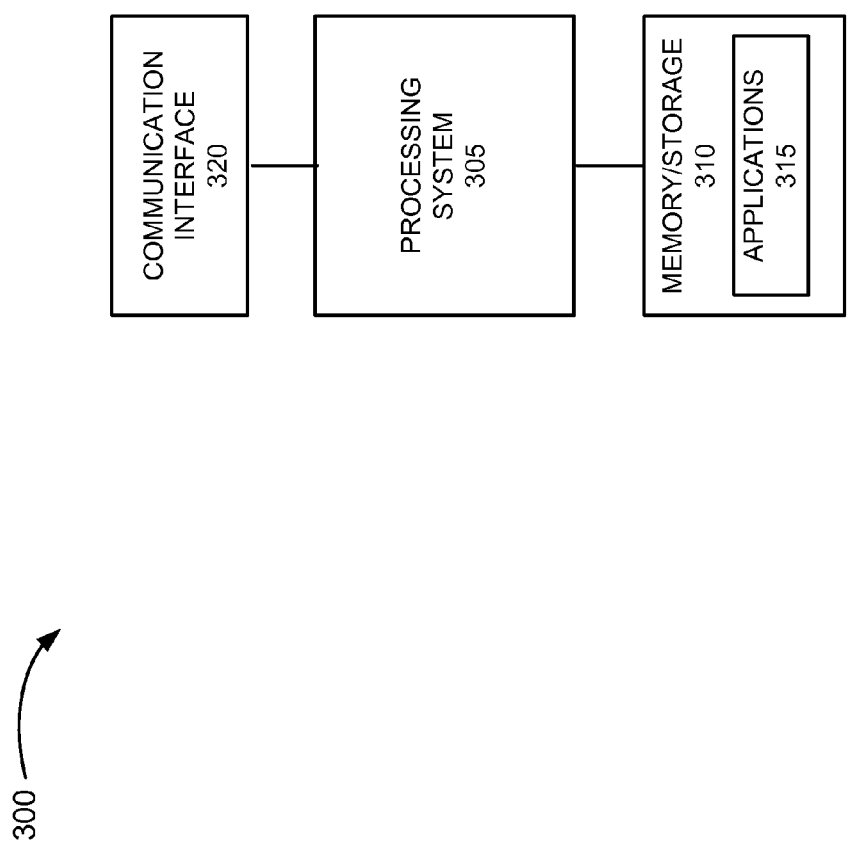

RECOMMENDATIONS BASED ON REAL-TIME USAGE INFORMATION

BACKGROUND

Typically, network operators and service providers provide various services to users based on a pre-paid pricing scheme. For example, a customer may pay a monthly fee for a particular service that may allow the customer unlimited use of the service or a limited use of the service.

BRIEF DESCRIPTION OF THE DRAWINGS

FIG. 3A is a diagram illustrating exemplary components of a device that may correspond to one or more of the devices in the environments depicted in FIGS. 1A-1E and FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "network," as used herein, is intended to be broadly interpreted to include a wireless network (e.g., mobile network, cellular network, non-cellular network, etc.) or a wired network. In this regard, the embodiments described herein may be implemented within a variety of network types, such as, for example, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, a Long Term Evolution (LTE) network, an evolved High Rate Packet Data (eHRPD) network, and/or another type of wireless network (e.g., an ad hoc network, etc.), or some other type of wired network.

Figure 1A:
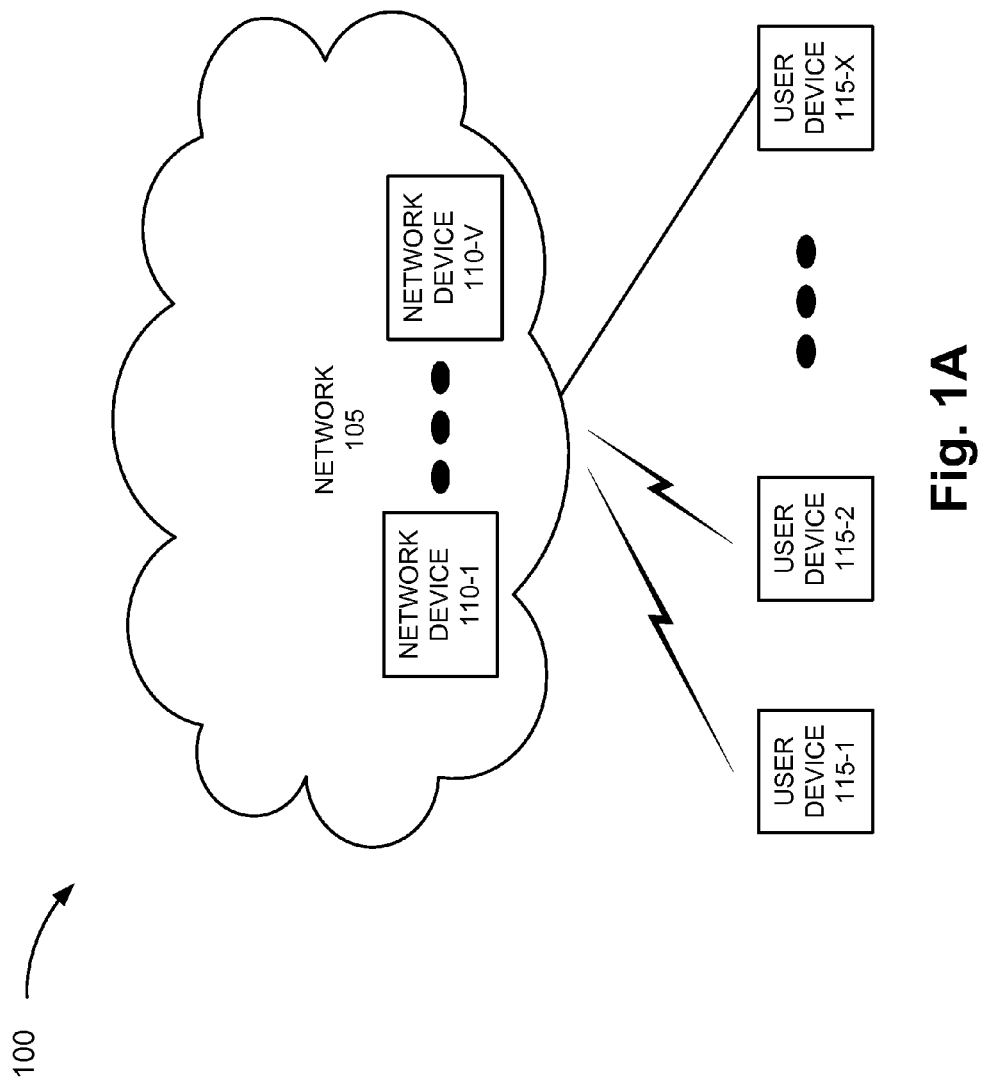
FIG. 1A is a diagram illustrating an exemplary environment in which providing recommendations based on real-time usage information may be implemented.

FIG. 1A is a diagram illustrating an exemplary embodiment of a network that provides recommendations to customers based on real-time usage information. As illustrated, an exemplary environment 100 may include network 105 including network devices 110-1 through 110-V (referred to as network devices 110 or network device 110), and user devices 115-1 through 115-X (referred to as user devices 110 or user device 110).

Network 105 may include one or multiple networks of one or multiple types. Network 105 may provide to customers various applications and/or services. Network devices 110 may include one or multiple network devices that provide recommendations to customers based on real-time usage information, as described herein.

User device 115 may include a device having the capability to communicate with other devices, systems, networks, and/or the like. In practice, user device 115 may correspond to a stationary device, a portable device, a handheld device, a mobile device, a vehicle-based device, or some other type of user device. As an example, user device 115 may correspond to a wireless telephone, a computer (e.g., a desktop, a laptop, a palmtop, a netbook, etc.), a personal digital assistant (PDA), a personal communication system (PCS) terminal, a gaming device, a music playing device, a video playing device, a location-aware device, and/or a television. User device 115 may operate according to one or multiple communication standards, protocols, etc. User device 115 may communicate via a wireless connection and/or via a wired connection.

According to exemplary embodiments, network devices 110 may provide tracking of real-time usage of applications and/or services by customers. Based on the real-time usage information, network devices 110 may generate service-related and/or product-related recommendations (referred to as "recommendations" or "recommendation"). Network devices 110 may provide these recommendations to the customers. The recommendations may pertain to a television service, an Internet service, a mobile service, a telephone service, and/or an application used by the customers via the service. As an example, the recommendations may include a recommendation of a service plan, a particular product, a service or an application control option, real-time usage information, and/or other status information pertaining to the customers' usage. According to an exemplary embodiment, the recommendations may be generated based on information, in addition to and/or instead of real-time usage information, such as, for example, date, time, or other metadata associated with the usage of the application and/or service, a transaction, and/or an event.

According to an exemplary embodiment, network devices 110 may use access point names (APN) to organize applications and services for tracking real-time usage and generating real-time usage information. For example, there may be applications and/or services in which tracking of real-time usage may be in terms of amount of data (e.g., number of bits, number of bytes, etc.), duration (e.g., number of minutes, etc.), transactions (e.g., number of messages (e.g., Short Messaging Service (SMS) messages, Multimedia Messaging Service (MMS) messages, etc.), number of downloads and/or uploads (e.g., music, pictures, video, etc.)), and/or other types of tracking that may be attributed to a particular application and/or service. According to other embodiments, network devices 110 may use other types of tracking, such as, for example, protocol used (e.g., Session Initiation Protocol (SIP), etc), system used (e.g., Internet Protocol Multimedia Subsystem (IMS), etc.), other attributes pertaining to the application or the service, other attributes pertaining to a service plan associated with the application or the service, etc., to organize the tracking of real-time usage pertaining to applications and/or services and generating real-time usage information. According to an exemplary embodiment, the type of tracking may be based on network tracking policies.

Figure 1B:
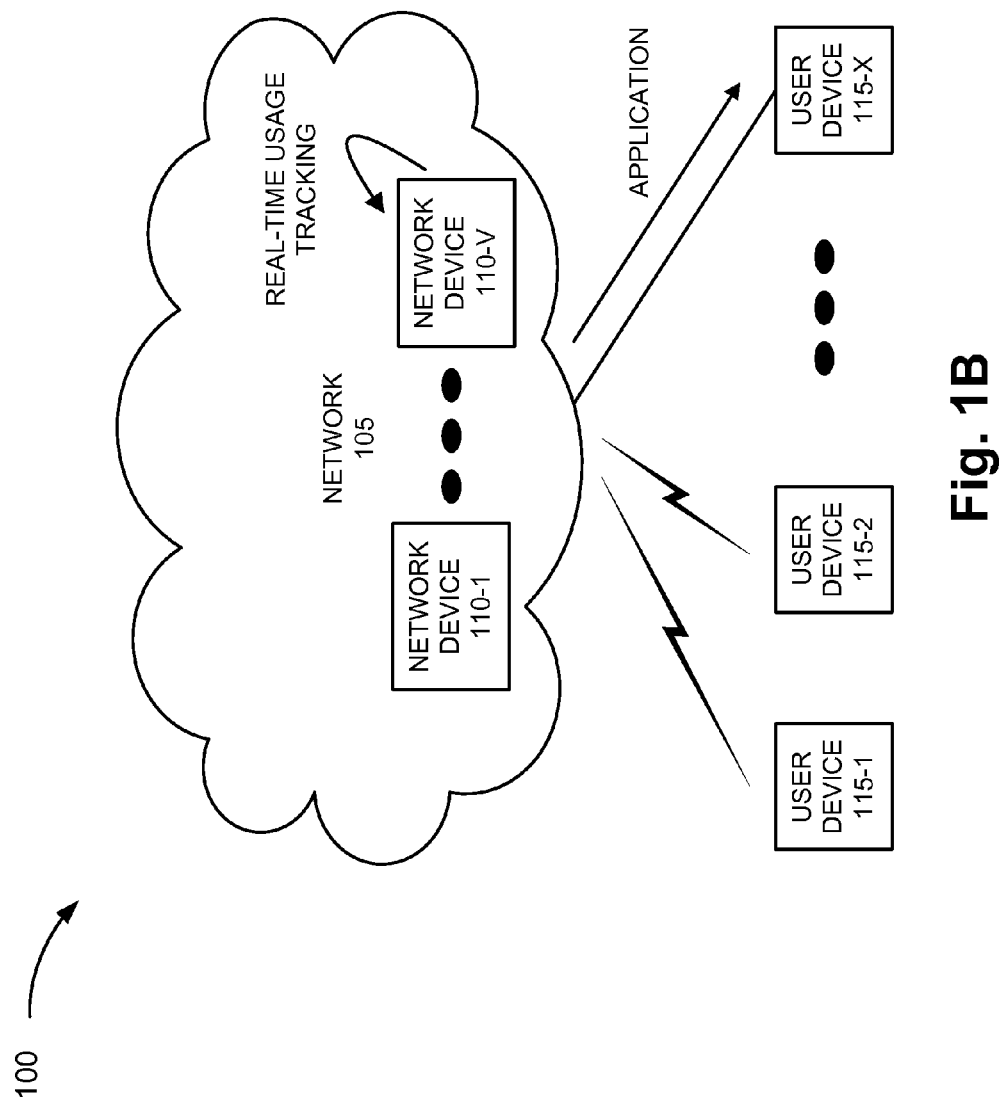
FIGS. 1B-1E are diagrams illustrating an exemplary process in which recommendations are provided to customers based on real-time usage information.

FIGS. 1B-1E are diagrams illustrating an exemplary process in which recommendations are provided to customers based on real-time usage information. Referring to FIG. 1B, in this example, a customer may access network 105 to use an application via user device 115-X. User device 115-X may be directed to a particular APN (e.g., based on a client application residing in user device 115-X, interaction with network 105, or some other method) and a session may be established for the customer to use the application. Upon the customer's use of the application, network device(s) 110 may perform real-time tracking of the customer's usage of the application.

Figure 1C:
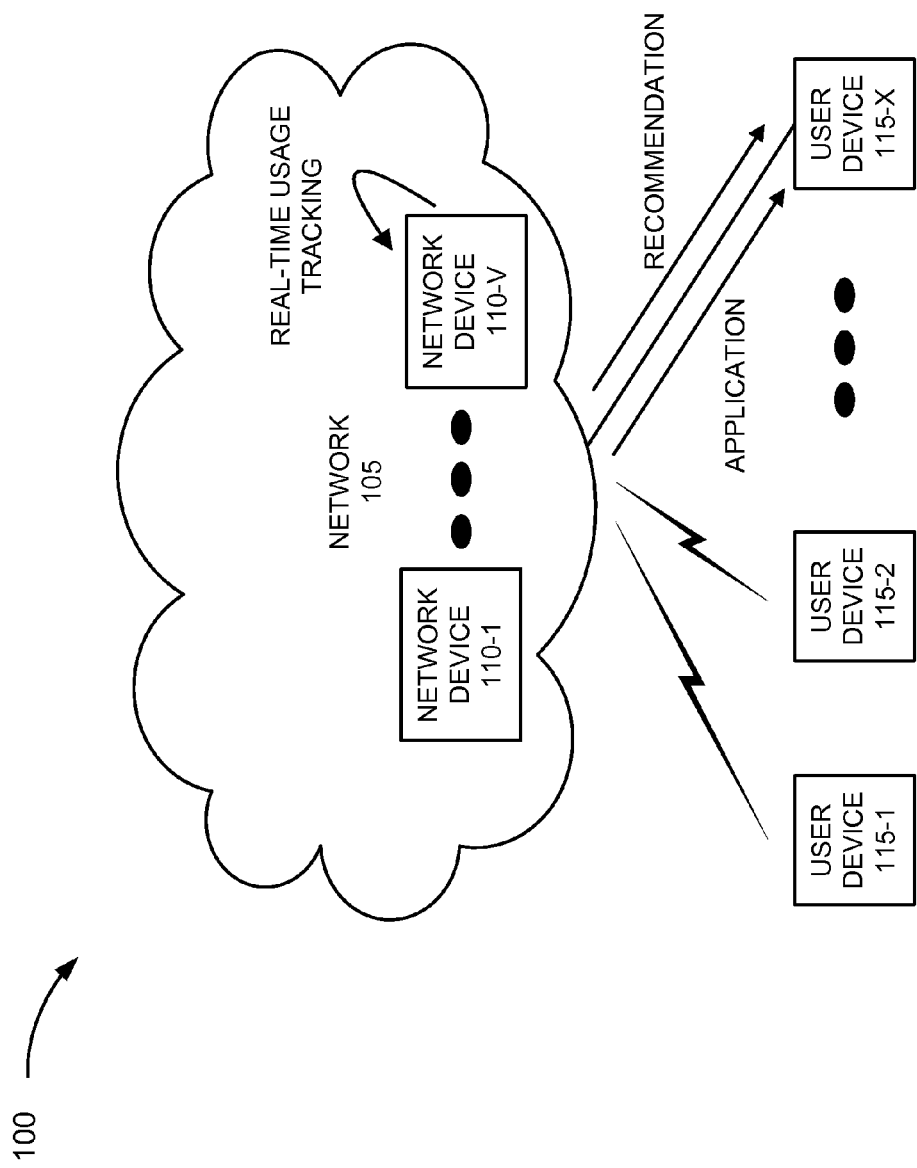

Referring to FIG. 1C, based on real-time usage information generated from the real-time tracking, network device(s) 110 may determine that the customer is approaching a limit in his/her service plan. Network device(s) 110 may generate a recommendation. For example, network device(s) 110 may identify options applicable to the customer's situation based on marketing information and network policies. In this example, the recommendation may include a balance remaining (e.g., corresponding to a real-time tracking (e.g., in terms of bytes, time, number of transactions, etc.) associated with the customer's current service plan), available next-level service plan(s), which the customer may sign-up for on a temporary basis or a permanent basis, and/or other service control options (e.g., stop service when the limit is reached, pay-as-you go once limit is reached, apply overage charges after limit is exceeded, etc.). As illustrated in FIG. 1C, network device(s) 110 may send the recommendation to the customer via user device 115-X. The recommendation may be sent to the customer using one or multiple avenues of communication (e.g., SMS message, MMS message, e-mail, voicemail, overlay, interactive bug, pop-up, etc.).

Figure 1D:
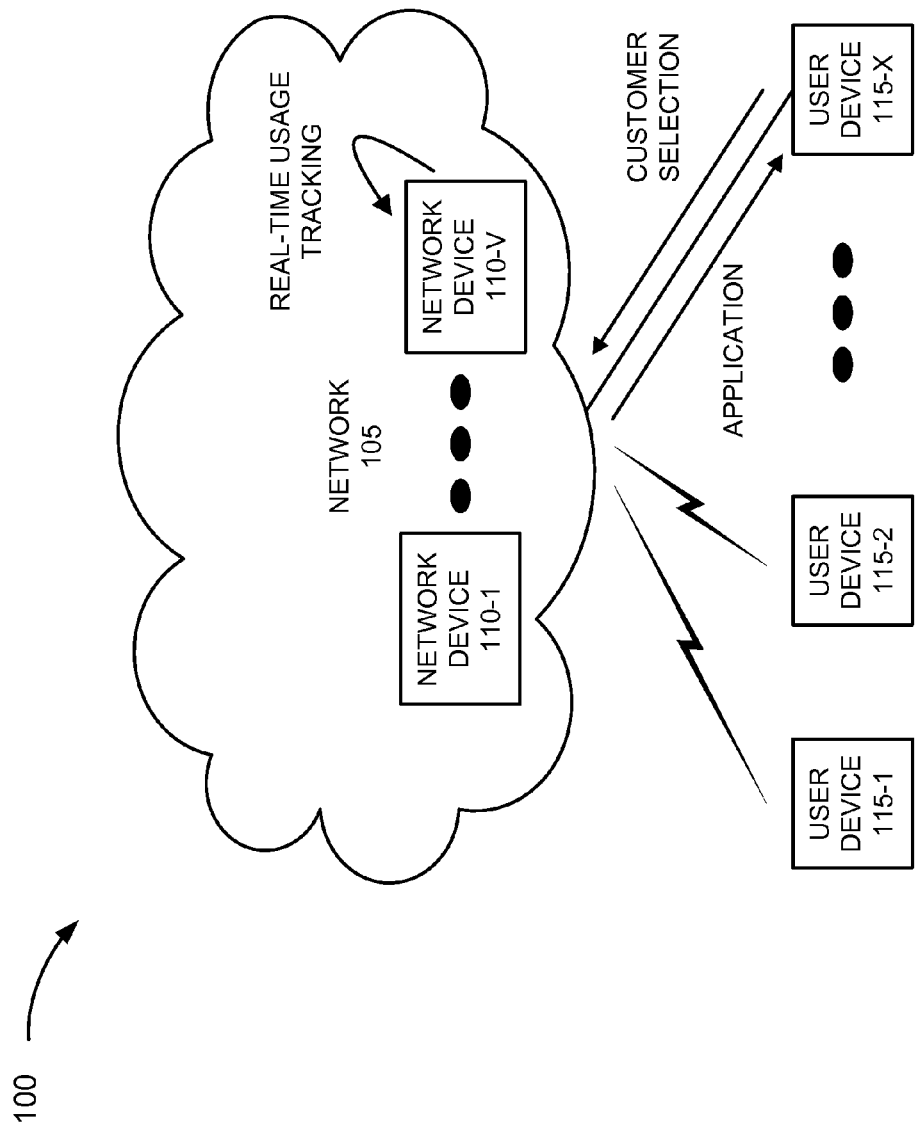
Figure 1E:
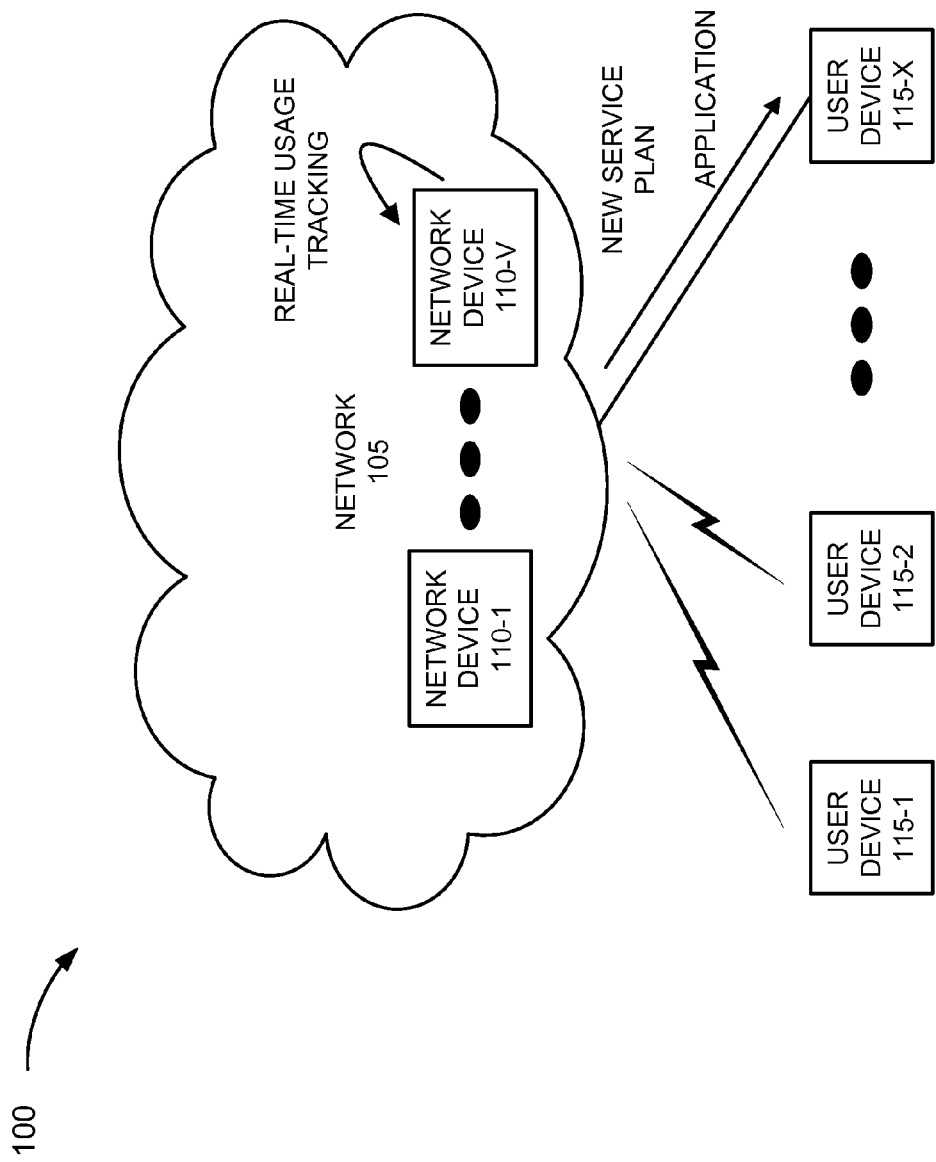

Referring to FIG. 1D, and according to this example, the customer may select from one of the recommendations presented. User device 115-X may send the customer's selection to network device(s) 110 and network device(s) 110 may provision the customer's selection. As an example, the customer may select a next-level service plan on a temporary basis (e.g., for this month and next month). As illustrated in FIG. 1E, the customer may continue to use the application in accordance with the selected next-level service plan. Additionally, network device(s) 110 may charge and bill the customer in accordance with the next-level service plan.

In view of the foregoing, real-time usage information may be collected and recommendations may be generated and provided to customers to allow customers to exercise real-time control pertaining to applications and/or services. For example, customers may select service plans or other application and/or service-related parameters to govern the provisioning of applications and/or services in a manner that conforms to their usage behavior (e.g., either current or intended future usage behavior), monetary budgets, etc. Additionally, although the above example has been described in association with a particular customer, according to other embodiments, the real-time tracking and generation of recommendations may be applied to multiple customers (e.g., a family, employees of a business, etc.).

Figure 2:
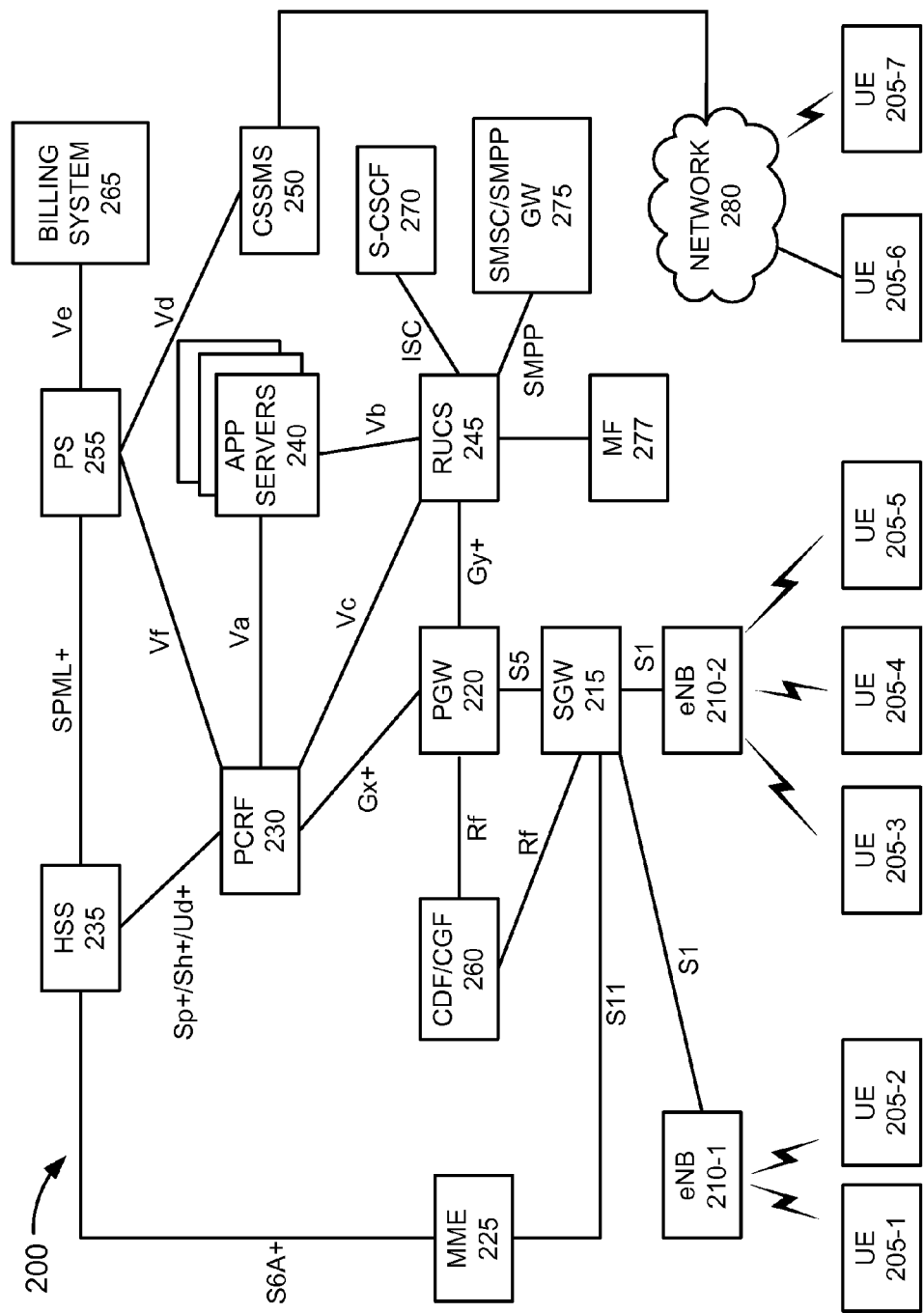
FIG. 2 is a diagram illustrating another exemplary environment in which providing recommendations based on real-time usage information may be implemented.

FIG. 2 is a diagram illustrating another exemplary environment in which providing recommendations based on real-time usage information may be implemented. As illustrated, environment 200 may include user equipment 205-1 through 205-7 (referred to generally as UE 205 or UEs 205), enhanced Node Bs (eNBs) 210-1 and 210-2 (referred to generally as eNB 210 or eNBs 210), a serving gateway (SGW) 215, a packet data network (PDN) gateway (PGW) 220, a mobility management entity (MME) 225, a policy and charging rules function (PCRF) 230, a home subscriber server (HSS) 235, application servers 240 (referred to generally as application servers 240 or application server 240), a real-time usage control system (RUCS) 245, a customer self-service managing system (CSSMS) 250, a provisioning system (PS) 255, a charging data function/charging gateway function (CDF/CGF) 260, a billing system 265, a serving call session control function (S-CSCF) 270, a short messaging service center/short message peer-to-peer gateway (SMSC/SMPP GW) 275, a marketing function (MF) 277, and a network 280. According to an exemplary implementation of the LTE communication standard, SGW 215, PGW 220, and MME 225 may form an Evolved Packet Core (EPC) network.

The number of devices and configuration in environment 200 is exemplary and provided for simplicity. In practice, environment 200 may include additional devices, fewer devices, different devices, and/or differently arranged devices than those illustrated in FIG. 2. For example, environment 200 may include a relay node, a home eNB (HeNB), a home node B (HNB), a femtocell, a picocell, a repeater, and/or a radio node. Additionally, or alternatively, for example, environment 200 may include a multimedia messaging service center (MMSC), an email server, and/or a voicemail server.

Additionally, or alternatively, environment 200 may include additional networks and/or fewer networks than those illustrated in FIG. 2. For example, environment 200 may include a television distribution network, the Internet, and/or a telephone network. Additionally, or alternatively, according to other embodiments, environment 200 may include additional modified interfaces and/or new interfaces, fewer modified interfaces and/or new interfaces, and/or different modified interfaces and/or new interfaces. By way of example, there may be a modified interface and/or a new interface between application servers 240 and MF 277, and/or between other devices. Thus, in practice, the number, the arrangement, and/or the type of interface(s) illustrated and described may be different in other embodiments from the number, the arrangement, and/or the type of interface(s) illustrated in FIG. 2 and described herein.

Also, according to other embodiments, one or more functions and/or processes described as being performed by a particular device in environment 200 may be performed by a different device or multiple devices. Additionally, or alternatively, one or more functions and/or processes described as being performed by multiple devices may be performed by different devices or a single device.

Although FIG. 2 illustrates separate instances of SGW 215, PGW 220, MME 225, RUCS 245, etc., according to other embodiments, two or more of these devices may be combined. For example, MME 225 may be combined with SGW 215, or PCRF 230 may be combined with RUCS 245, etc. Environment 200 may include wired and/or wireless connections among the devices illustrated.

UE 205 may include a device having the capability to communicate with other devices, systems, networks, and/or the like. For example, UE 205 may include a wireless telephone, an Internet Protocol (IP) telephone, a computer (e.g., a laptop computer, a palmtop computer, a netbook, a desktop computer, etc.), a PDA, a gaming device, a PCS terminal, a video playing device, a music playing device, a location-aware device, and/or some other type of user device. UE 205 may operate according to one or more versions of the LTE communication standard and/or one or more versions of the eHRPD communication standard.

According to other embodiments, UE 205 may operate according to one or more other wireless and/or wired network standards.

ENB 210 may include a network device that operates according to one or more versions of the LTE communication standard. Additionally, according to other exemplary embodiments, eNB 110 may operate according to wireless access technologies (e.g., radio access technologies, etc.) other than or in addition to the LTE communication standard. For example, eNB 210 may operate according to HRPD, e-HRPD, Code Division Multiple Access (CDMA), CDMA 2000, etc. SGW 215, PGW 220, and MME 225 may each include a network device that operates according to one or more versions of the LTE communication standard. Additionally, according to other exemplary embodiments, SGW 215, PGW 220, and MME 225 may operate according to one or more communication standards other than the LTE communication standard.

PCRF 230 may include a network device that manages bandwidth, charging rates, and policies. According to an exemplary embodiment, PCRF 230 may include a real-time usage control policy repository separation function, an application delivery control policy repository separation function, a real-time aggregated usage packaging function, a real-time aggregated usage dispatch function, and an application delivery control policy update notification function.

The real-time usage control policy repository separation function may manage real-time usage control policies. For example, a real-time usage control policy repository may store real-time usage control policies pertaining to applications and/or services provided by application servers 240. According to an exemplary process, when a customer requests an application and/or a service, the real-time usage control policy repository separation function may examine a request from an application server 240 and determine appropriate real-time usage control policies that pertain to the requested application and/or service. The real-time usage control policy repository separation function may send, make available, or provide the appropriate real-time usage control policies to application server 240.

The application delivery control policy repository separation function may manage application delivery control policies. For example, an application delivery control policy repository function may store application delivery control policies pertaining to applications and/or services provided by application servers 240. According to an exemplary process, when a customer requests an application and/or a service, the application delivery control policy repository separation function may examine a request from an application server 240 and determine appropriate application delivery control policies that pertain to the requested application and/or service. The application delivery control policy repository separation function may send, make available, or provide the appropriate application delivery control policies to the application server 240.

The real-time aggregated usage packaging function may aggregate real-time usage information and provide the aggregated real-time usage information to other network devices. For example, the real-time aggregated usage packaging function may receive, retrieve, or obtain real-time usage information from RUCS 245. The real-time aggregated usage packaging function may then aggregate the real-time usage information and send, make available, or provide the aggregated real-time usage information to HSS 235.

The real-time aggregated usage dispatch function may provide aggregated real-time usage information to other network devices. For example, the real-time aggregated usage dispatch function may send, make available, or provide the aggregated real-time usage information to HSS 235 or to HSS 235 via PS 255.

The application delivery control policy update notification function may provide policy updates to RUCS 245 pertaining to applications and/or services provided by application servers 240. For example, the policy updates may include application delivery control policies.

HSS 235 may include a network device that stores and manages subscriber information (e.g., subscriber profiles, etc.). HSS 235 may also provide other services (e.g., authentication, authorization, etc.). According to an exemplary embodiment, HSS 235 may include an application delivery and usage control provisioning function and a real-time aggregated usage dispatch function.

The application delivery and usage control provisioning function may receive, retrieve, or obtain application delivery control policies and real-time usage control policies that may be provisioned on or by HSS 235. For example, the application delivery and usage control provisioning function may receive, retrieve, or obtain application delivery control policies and real-time usage control policies from PCRF 230. The application delivery and usage control provisioning function may receive, retrieve, or obtain customer-configured application delivery control information and customer-configured usage control information that may be provisioned on or by HSS 235. For example, the application delivery and usage control provisioning function may receive, retrieve, or obtain customer-configured application delivery control information and customer-configured usage control information from CSSMS 250 via PS 255.

The real-time aggregated usage dispatch function may provide aggregated real-time usage information to other network devices. For example, the real-time aggregated usage dispatch function may send, make available, or provide the aggregated real-time usage information to PCRF 230 and/or PS 255.

Application servers 240 may provide various applications, services, content, etc., to customers. According to an exemplary embodiment, application servers 240 may include a real-time usage tracking function, a real-time usage control policy enforcement function, a real-time usage control policy repository relay function, an application delivery control policy repository relay function, and an application delivery control policy enforcement function The real-time usage tracking function may track and/or collect customers' usage of applications and/or services. The real-time usage tracking function may send, make available, or provide the real-time usage information to RUCS 245.

The real-time usage control policy enforcement function may enforce usage controls pertaining to customers' usage of applications and/or services. For example, the real-time usage control policy enforcement function may enforce real-time usage based on real-time usage control policies and/or instructions received, retrieved, or obtained from RUCS 245.

The real-time usage control policy repository relay function may relay real-time usage control policies to other network devices. For example, the real-time usage control policy repository relay function may relay real-time usage control policies from PCRF 230 to RUCS 245.

The application delivery control policy repository relay function may relay application delivery control policies to other network devices. For example, the application delivery control policy repository relay function may relay application delivery control policies from PCRF 230 to RUCS 245.

The application delivery control policy enforcement function may enforce delivery controls pertaining to the delivery of applications and/or services to customers. For example, the application delivery control policy enforcement function may enforce application delivery control based on application delivery control policies and/or instructions received, retrieved, or obtained from RUCS 245.

RUCS 245 may include a network device that tracks or collects real-time usage information pertaining to applications and/or services. According to an exemplary embodiment, RUCS 245 may be implemented as a part of an online charging system (OCS). For example, online charging may include charging that may affect, in real-time, services provided. In this regard, RUCS 245 may have a direct interaction with session and service control (e.g., S-CSF 270, etc.).

According to an exemplary embodiment, RUCS 245 may provide the real-time usage information to MF 277 to allow MF 277 to generate recommendations. According to an exemplary embodiment, RUCS 245 may include a real-time usage control policy function, an application delivery control policy function, a real-time usage collection and aggregate function, and an application delivery control policy update enforcement function.

The real-time usage control policy function may generate real-time usage control instructions. According to an exemplary embodiment, the real-time usage control policy function may generate real-time usage control instructions based on real-time usage information and real-time control policies. The real-time usage control instructions may be sent, made available, or provided to application servers 240, where the real-time usage control instructions may be enforced by application servers 240 (e.g., the real-time usage control policy enforcement function).

The application delivery control policy function may generate application delivery control instructions. According to an exemplary embodiment, the application delivery control policy function may generate application delivery control instructions based on real-time usage information and application delivery control policies. The application delivery control instructions may be sent, made available, or provided to application servers 240, where the application delivery control instructions may be enforced by application servers 240 (e.g., the application delivery control policy enforcement function).

The real-time usage collection and aggregate function may receive, retrieve, or obtain real-time usage information from application servers 240 and aggregates this real-time usage information. The real-time usage collection and aggregate function may generate real-time usage control instructions based on the real-time usage control policies. The aggregated real-time usage information may be sent, made available, or provided to PCRF 230, where the aggregated real-time usage information may be stored and shared with other network devices.

The application delivery control policy update enforcement function may keep track of application usage status and/or service usage status and generate changes to application delivery control policies based on the application usage status and/or the service usage status. The application delivery control policy update enforcement function may update application delivery control policies with PCRF 230.

CSSMS 250 may include a network device that permits customers to manage their accounts, select products and services, and set user preferences. According to an exemplary embodiment, CSSMS 250 may include a customer application delivery and usage control configuration function.

The customer application delivery and usage control configuration function may provide user interfaces (e.g., graphical user interfaces) that permit customers to manage their account(s), select products, select services, and/or set user preferences pertaining to applications and/or services provided by network 205 and/or accessible via network 205. For example, customers may access their accounts pertaining to television service, telephone service, mobile service, and/or Internet service. Customers may be able to select various products (e.g., mobile phones, mobile phone accessories, set top boxes, routers, etc.) select various services (e.g., service plans, service packages, service bundles, etc.), and/or change products and/or services. Additionally, customers may be able to configure preferences pertaining to the services and/or applications to which they are subscribed and/or to which they have access. For example, customers may configure time-based preferences, overage preferences, blocking preferences, and/or location-based preferences. For example, with reference to time-based preferences and location-based preferences, customers may control service and/or application behavior based on the time of day, the day of the week, and/or the location of the customer. For example, with reference to overage preferences, customers may control whether service is terminated once service limits are reached (e.g., maximum messages are reached, maximum minutes allowed are reached, maximum number of bits/bytes reached, etc.), whether service should be changed to a next-level of service once service limits are reached (e.g., either permanently or temporarily), or whether service overage may be charged according to overage charges (e.g., each message over maximum is $0.50, etc.) when service limits are exceeded. For example, with reference to blocking preferences, customers may prevent particular customers and/or third parties from sending messages to the customers and/or block particular content (e.g., adult content, violent content, etc.).

The customer application delivery and usage control configuration function may provide customer-configured data and/or information to PS 255. PS 255 may provision the customer-configured data and/or information on HSS 235.

PS 255 may include a network device to manage the provisioning of information. For example, PS 255 may provision information with other network devices, such as, for example, HSS 235 and billing system 265. According to an exemplary embodiment, PS 255 may include an application delivery and usage control provisioning function and an application delivery and usage control relay function.

The application delivery and usage control provisioning function may provide for the provisioning of application delivery control information and real-time usage control information with HSS 235 and billing system 265. For example, the application delivery and usage control provisioning function may receive, retrieve, or obtain application delivery control information and real-time usage control information from PCRF 230 and provision this information with HSS 235 and billing system 265.

The application delivery and usage control relay function may provide for the relaying and/or provisioning of application delivery control information and real-time usage control information with HSS 235 and billing system 265. For example, the application delivery and usage control relay function may receive, retrieve, or obtain customer-configured application delivery control information and/or customer-configured usage control information from CSSMS 250 and provision this information with HSS 235 and billing system 265.

CDF/CGF 260 may include a network device that provides for the collection, creation, and storage of charging information pertaining to offline charging. For example, offline charging may include charging that does not affect, in real-time, services provided.

Billing system 265 may include a network device that manages billing. For example, billing system 265 may generate bills to be provided to customers based on charging information (e.g., charging records, etc.). According to an exemplary embodiment, billing system 265 may include an application delivery and usage control provisioning function.

The application delivery and usage control provisioning function may manage the provisioning or use of application delivery control information and/or usage control information received, retrieved, or obtained from PS 255.

S-CSCF 270 may include a network device that provides session control. SMSC/SMPP GW 275 may include a network device that manages the delivery of SMS messages. SMSC/SMPP GW 275 may also provide protocol conversion services to permit interconnection of existent systems with SMPP services. SMSC/SMPP GW 275 may support multiple protocols, including, for example, the SMPP protocol, the Mobile Application Part (MAP) protocol, etc.

MF 277 may include a network device that generates recommendations based on real-time usage information. As previously described, the recommendations may pertain to service and/or products offered in environment 200 and/or by a service provider. By way of example, the recommendations may include recommendations pertaining to available service plans, products, real-time usage information (e.g., aggregate usage information, balance remaining information, etc.), service control options, user preference options, and/or overage options. Although not illustrated, MF 277 may include interfaces to various network devices illustrated in FIG. 2.

The recommendations may pertain to an individual customer or a group of customers (e.g., a family, a business, etc.). As previously described, the recommendations may be provided to the customer(s) using one or multiple avenues of communication. According to an exemplary embodiment, the recommendations may be sent to the customer(s) during their use of the application or the service. According to another exemplary embodiment, the recommendations may be sent to the customer(s) at a later time.

As previously described, according to an exemplary embodiment, MF 277 may identify options, service plans, products, etc., that may be applicable to the customer's usage behavior based on marketing information (e.g., packages, promotional offers, service plans, etc.), real-time usage information, and/or network policies. As an example, if the real-time usage information indicates that the customer is close to reaching his/her service limit, MF 277 may identify one or more service plans which may better-suit the customer's usage behavior. As another example, if the real-time usage information indicates that the customer is downloading or uploading large files, MF 277 may identify one or more service plans that provide greater bandwidth. Additionally, MF 277 may identify other options, products, etc., that may be applicable. In this way, MF 277 may provide customers with recommendations which may assist customers in optimizing their current choice or level of service, selecting new services, etc.

Network 280 may include a network that provides access to CSSMS 250, other types of networks (e.g., a television distribution network, the Internet, etc.), and/or various applications, services, etc.

According to an exemplary embodiment, environment 200 may include new and modified interfaces to support the real-time tracking of usage information and provide recommendations, as described herein. For example, referring to FIG. 2, environment 200 may include new interfaces (Va), (Vb), (Vc), (Vd), (Ve), and (Vf). Additionally, environment 200 may include modified interfaces (Sp+/Sh+/Ud+), (Gx+), (Gy+), and (SPML+). Exemplary embodiments of the new and modified interfaces are described further below.

The (Va) interface may reside between PCRF 230 and application servers 240. The (Va) interface may be used to communicate policy information. For example, the policy information may include real-time usage control policies and application delivery control policies. The (Va) interface may be implemented using the Diameter protocol or some other appropriate protocol. According to an exemplary embodiment, attribute-value pairs (AVPs) may be used to communicate the policy information and/or other information, as described herein.

The (Vb) interface may reside between application servers 240 and RUCS 245. The (Vb) interface may be used to communicate usage, instructional, and policy information. For example, the usage, instructional, and policy information may include real-time usage information, instructions pertaining to usage control and application delivery control, real-time usage control policies, and application delivery control policies. The (Vb) interface may be implemented using the Diameter protocol or some other appropriate protocol. According to an exemplary embodiment, attribute-value pairs (AVPs) may be used to communicate the usage, instructional, policy information, and/or other information, as described herein.

The (Vc) interface may reside between RUCS 245 and PCRF 230. The (Vc) interface may be used to communicate aggregate information and updated policy information. For example, the aggregate information and the updated policy information may include aggregated real-time usage information and updated application delivery control policies. The (Vc) interface may be implemented using the Diameter protocol or some other appropriate protocol. According to an exemplary embodiment, attribute-value pairs (AVPs) may be used to communicate the aggregate information, the updated policy information, and/or other information, as described herein.

The (Vd) interface may reside between CSSMS 250 and PS 255. The (Vd) interface may be used to communicate customer-configured information. For example, the customer-configured information may include customer-configured application delivery control information and customer-configured usage control information. The (Vd) interface may be implemented using the Hypertext Transfer Protocol (HTTP), the Extensible Markup Language (XML) protocol, or some other appropriate protocol.

The (Ve) interface may reside between PS 255 and billing system 265. The (Ve) interface may be used to communicate control information and customer-configured information. For example, the control information and customer-configured information may include application delivery control information, real-time usage control information, customer-configured application delivery control information, and customer-configured usage control information. The (Ve) interface may be implemented using the Hypertext Transfer Protocol (HTTP), the Extensible Markup Language (XML) protocol, or some other appropriate protocol.

The (Vf) interface may reside between PCRF 230 and PS 255. The (Vf) interface may be used to communicate aggregate information. For example, the aggregate information may include aggregated real-time usage information. The (Vf) interface may be implemented using the Hypertext Transfer Protocol (HTTP), the Extensible Markup Language (XML) protocol, or some other appropriate protocol.

The (Sp+/Sh+/Ud+) interface may reside between PCRF 230 and HSS 235. The (Sp+/Sh+/Ud+) may be used to communicate real-time usage control information and service plan information associated with customers. The (Gx+) interface may reside between PCRF 230 and PGW 220. The (Gx+) interface may be used to communicate real-time usage control policies and transport service control policies. The (Gy+) interface may reside between PGW 220 and RUCS 245. The (Gy+) interface may be used to communicate real-time usage information and transport service control information. The (SPML+) interface may reside between PS 255 and HSS 235. The (SPML+) interface may be used to communicate customer-configured application delivery control information and/or customer-configured usage control information.

FIG. 3A is a diagram illustrating exemplary components of a device 300 that may correspond to one or more of the devices in environment 100 and environment 200. For example, device 300 may correspond to user device 115, network device 110, UE 205, eNB 210, SGW 215, PGW 220, MME 225, PCRF 230, HSS 235, application servers 240, RUCS 245, CSSMS 250, PS 255, billing system 265, as well as other devices (e.g., S-CSCF 270, SMSC/SMPP GW 275, MF 277), depicted in FIGS. 1A-1E and 2A. As illustrated, device 300 may include a processing system 305, memory/storage 310 including applications 315, and a communication interface 320. According to other implementations, device 300 may include fewer components, additional components, different components, and/or a different arrangement of components than those illustrated in FIG. 3A and described herein.

Processing system 305 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion of operation(s) performed by device 300. Processing system 305 may perform one or multiple operations based on an operating system and/or various applications (e.g., applications 315). Processing system 305 may access instructions from memory/storage 310, from other components of device 300, and/or from a source external to device 300 (e.g., another device, a network, etc.).

Memory/storage 310 may include one or multiple memories and/or one or multiple secondary storages. For example, memory/storage 310 may include a random access memory (RAM), a dynamic random access memory (DRAM), a read only memory (ROM), a programmable read only memory (PROM), a flash memory, and/or some other type of storing medium (e.g., a computer-readable medium, a compact disk (CD), a digital versatile disk (DVD), or the like). Memory/storage 310 may include a hard disk (e.g., a magnetic disk, an optical disk, a magneto-optic disk, a solid state disk, etc.) or some other type medium, along with a corresponding drive. Memory/storage 310 may be external to and/or removable from device 300, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 310 may store data, application(s), and/or instructions related to the operation of device 300.

Applications 315 may include software that provides various services or functions. For example, applications 315 may include applications that perform various network-related and/or communication related functions. According to an exemplary embodiment, applications 315 may include one or multiple applications to implement the providing of recommendations based on real-time usage information, as described herein.

Communication interface 320 may permit device 300 to communicate with other devices, networks, systems and/or the like. Communication interface 320 may include one or multiple wireless interfaces and/or wired interfaces. Communication interface 320 may include one or multiple transmitters, receivers, and/or transceivers. Depending on the network, communication interface 320 may include interfaces according to one or multiple communication standards.

Device 300 may perform operations in response to processing system 305 executing software instructions stored memory/storage 310. For example, the software instructions may be read into memory/storage 310 from another memory/storage 310 or from another device via communication interface 320. The software instructions stored in memory/storage 310 may cause processing system 305 to perform processes described herein. Alternatively, according to another implementation, device 300 may perform processes based on the execution of hardware (e.g., processing system 305, etc.), the execution of hardware and firmware, or the execution of hardware, software (e.g., applications 315), and firmware.

Figure 3B:
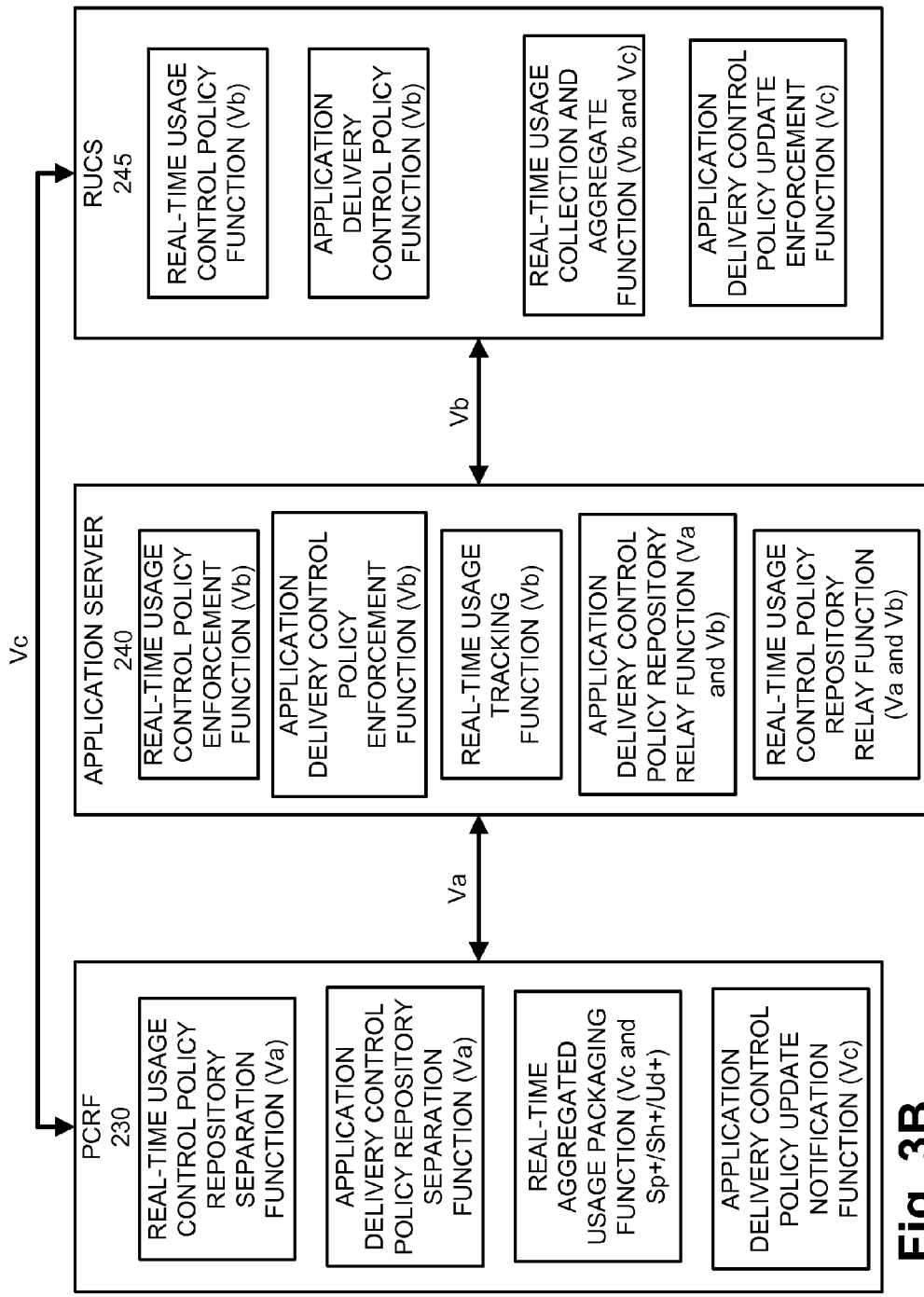
FIGS. 3B and 3C are diagrams illustrating exemplary components that may be implemented by devices previously described in FIG. 2.
Figure 3C:
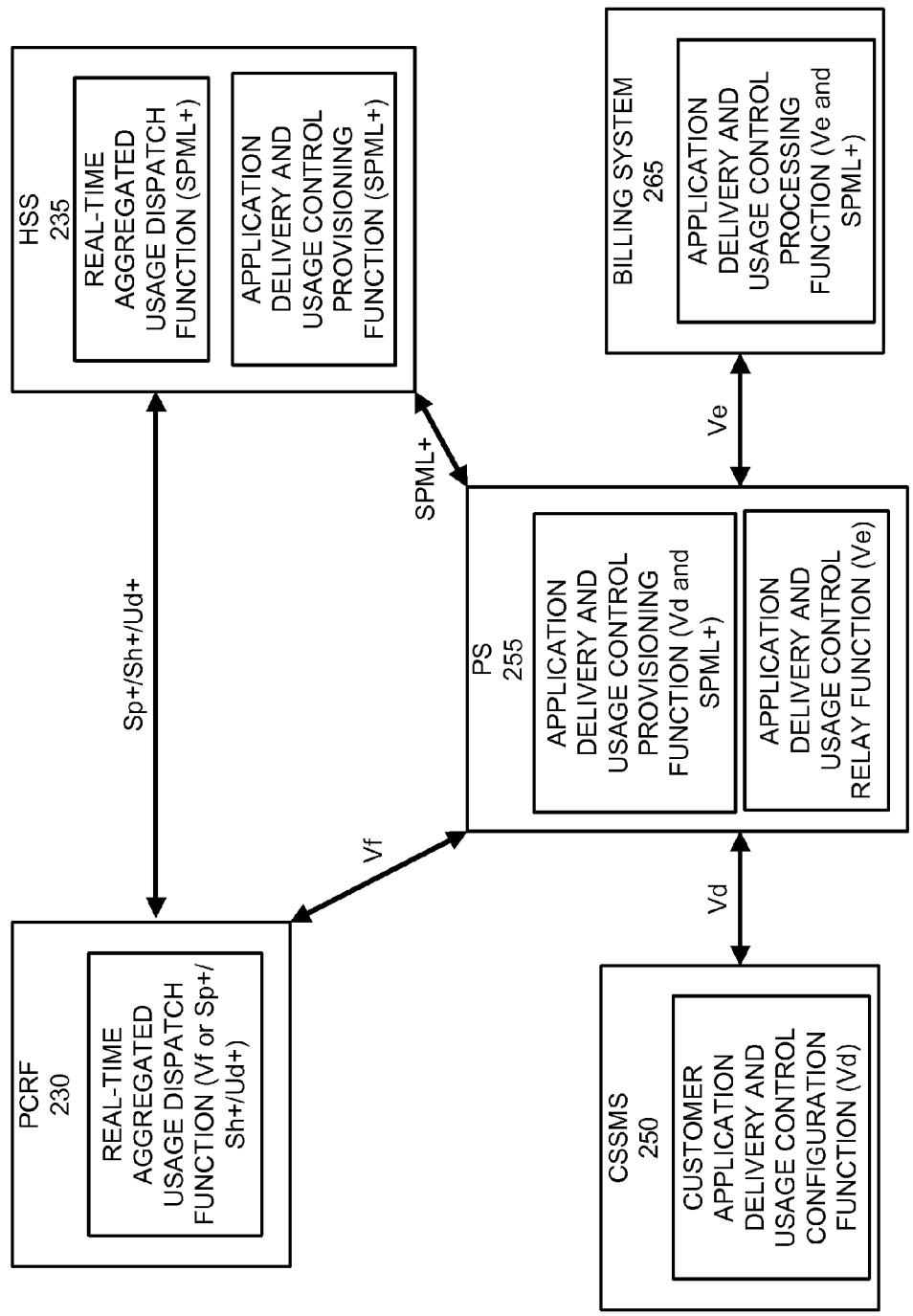

As previously described, according to exemplary embodiments, network device(s) may provide tracking of real-time usage of applications and/or services by customers. Based on the real-time usage information, network device(s) may generate service and/or product-related recommendations and provide these recommendations to the customers. FIGS. 3B and 3C are diagrams illustrating exemplary components that may be implemented by devices previously described in environment 200 for providing recommendations based on real-time usage information.

According to an exemplary process, during connection or session establishment invoked by a customer requesting a service or an application, SGW 215 may select an appropriate PGW 220 based on a mapping between an APN and an application or a service. According to another exemplary process, SGW 215 may select an appropriate PGW 220 based on other tracking policies, as previously described. PGW 220 may serve as an anchor point for traffic pertaining to the customer's usage of the requested service or the requested application.

Referring to FIG. 3B and with reference to exemplary embodiments of PCRF 230, application server 240, and RUCS 245, when the customer makes a request for applications and/or services, application server 240 may inform PCRF 230. The real-time usage control policy repository separation function and the application delivery control policy repository separation function of PCRF 230 may select the appropriate real-time usage control policies and the appropriate application delivery control policies, respectively, based on the request. For example, the request may include an identifier of the customer, the type of application and/or service requested, and/or other appropriate information. Application server 240 may receive, retrieve, or obtain the policies from PCRF 230 via the (Va) interface. The real-time usage control policy enforcement function and the application delivery control policy enforcement function of application server 240 may enforce the policies. The real-time usage tracking function of application server 240 may track and/or collect the customer's usage. The application delivery control policy repository relay function and the real-time usage control policy repository relay function of application server 240 may send, make available, or provide the policies to RUCS 245 via the (Vb) interface. Additionally, the real-time aggregated usage packaging function and the application delivery control policy update notification function of PCRF 230 may perform processes, as previously described.

According to an exemplary embodiment, PCRF 230 may send, make available, or provide control information on a per-customer basis to application servers 240 via the (Va) interface. The control information may include, for example, usage control information, such as, maximum application units/per time period (e.g., monthly, etc.), current aggregated application units to date, limits on application units permitted (e.g., on a daily basis, weekly basis, etc.); content control information (e.g., all content allowed, adult content blocked, etc.); service control information, such as, refusing service if maximum application units reached, refusing service within a particular time period or allowing service with next-level pricing or normal overage pricing, overage option information, and/or other user preferences.

Referring to RUCS 245, RUCS 245 may receive, retrieve, or obtain real-time usage information from application server 240 via the (Vb) interface. The real-time usage control policy function and the application delivery control policy function of RUCS 245 may generate instructions based on the real-time usage information and send, make available, or provide the instructions to application server 240 via the (Vb) interface. The instructions may include instructions pertaining to real-time usage control and application delivery control. For example, the real-time usage control policy function and the application delivery control may use usage policies and delivery policies, in view of the real-time usage information to generate appropriate instructions. For example, the instruction may include instructions to reduce the available bandwidth available to the customer when the customer is nearing his/her service plan limit. The enforcement functions of application server 240 may use the instructions to enforce real-time usage and application delivery controls. The real-time usage collection and aggregate function and the application delivery control policy update enforcement function of RUCS 245 may perform processes, as previously described. For example, aggregated real-time usage information and updates may be sent, made available, or provided to PCRF 230 via the (Vc) interface.

As previously described, according to an exemplary embodiment, RUCS 245 may provide the real-time usage information to MF 277 to generate the recommendations. MF 277 may reside in RUCS 245 or in another network device (as illustrated in FIG. 2). MF 277 may generate recommendations and provide the recommendations via various forms of communication (e.g., SMS, etc.), as previously described. In the event the customer selects one of the recommendations, the customer's selection may be provisioned so that application(s) or service(s) are provided to the customer in accordance with the customer's selection.

According to an exemplary embodiment, the provisioning may include provisioning performed by PS 255.

Referring to FIG. 3C, the real-time aggregated usage dispatch function of PCRF 230 may send, make available, or provide aggregated real-time usage information to HSS 235 via the modified (SP+/Sh+/Ud+) interface or to HSS 235 via the (Vf) interface and PS 255. According to an exemplary embodiment, as previously described, the customer application delivery and usage control configuration function of CSSMS 250 may send, make available, or provide customer-configured data and/or information to PS 255 via the (Vd) interface. The customer-configured data and/or information may include control information (e.g., usage control information, content control information, service control information, etc.).

Additionally, as illustrated in FIG. 3C, the application delivery and usage control provisioning function and the application delivery and usage control relay function of PS 255 may use the modified (SPML+) interface and the (Ve) interface to provision HSS 235 and billing system 265, respectively. Billing system 265 may charge customers according to their service plan, real-time usage, customer-configured data and/or information, etc.

Although FIGS. 3B and 3C illustrates exemplary components, according to other implementations, additional components, different components, and/or a different arrangement of components than those illustrated in FIGS. 3B and 3C and described may be implemented. Additionally, according to other embodiments, networks different from an LTE network may include these components. As an example, a home location register (HLR) may be implemented as HSS 235, a Gateway General Packet Radio Service (GPRS) Support Node (GGSN) may be implemented as PGW 220, a policy/enforcer device may be implemented as PCRF 230, or a charging device or some other type of network device may be implemented as RUCS 245. Further, according to such other exemplary embodiments, new and/or modified communication interfaces may be used, as well as new and/or modified messaging.

Figure 4A:
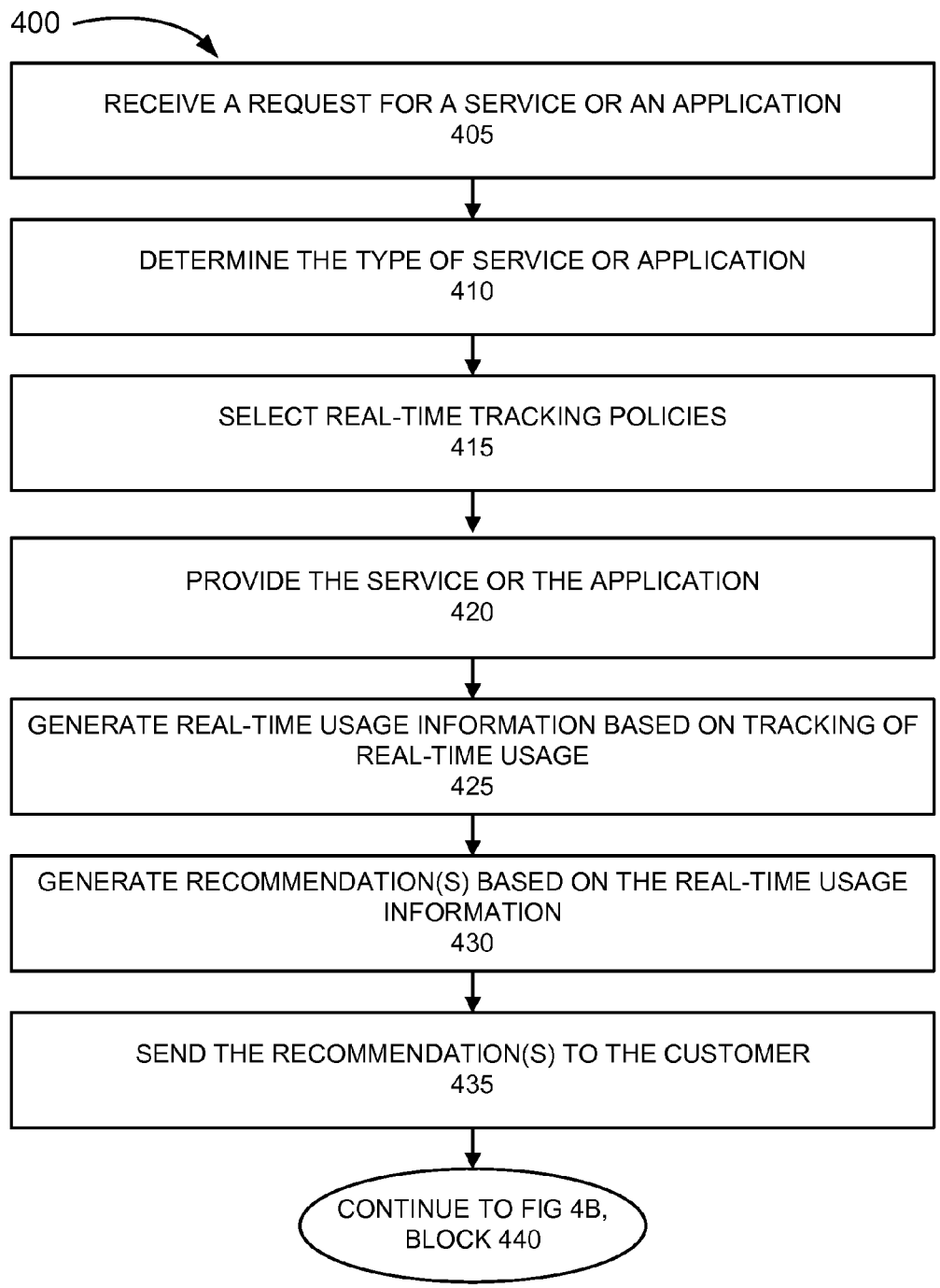
FIGS. 4A and 4B are flow diagrams illustrating an exemplary process in which recommendations may be provided to customers based on real-time usage information.
Figure 4B:
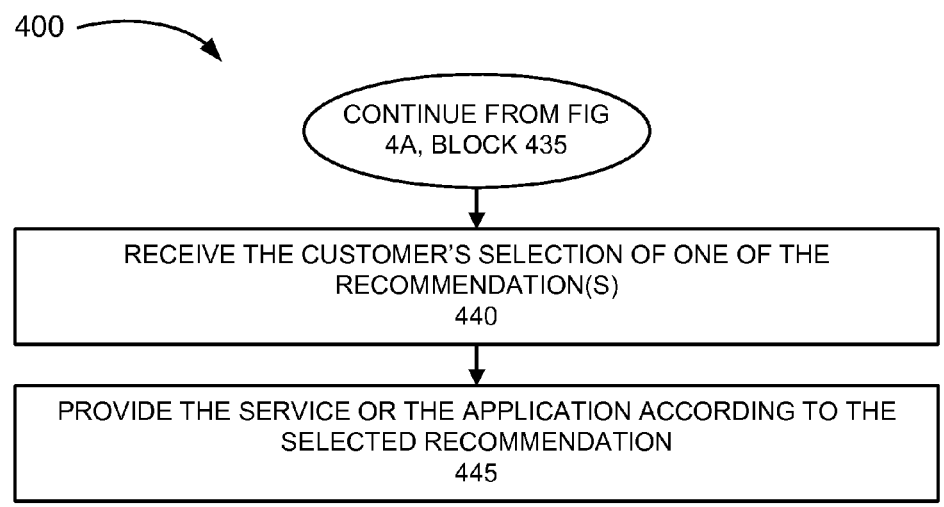

FIGS. 4A and 4B are flow diagrams illustrating an exemplary process 400 in which recommendations may be provided to customers based on real-time usage information. Process 400 may be performed in a network that includes, among other devices, RUCS 245 and MF 277. The network may include new and/or modified interfaces relative to a communication standard and in relation to network devices of the network. The network may also use new and/or modified messaging to communicate data and/or information, as previously described.

Referring to FIG. 4A, process 400 may include receiving a request for a service or an application (block 405). For example, as previously described, a customer may send a request for the service or the application via a user device. The request may be received by a network.

The type of service or the type of application may be determined (block 410). For example, as previously described, the network may determine the type of service or the type of application based on the request.

Real-time tracking policies may be selected (block 415). For example, as previously described, the network may organize applications and/or services for tracking real-time usage. Depending on the type of application or service, the network may select the appropriate tracking policies. For example, as previously described, the tracking policies may govern, among other things, whether the tracking is in terms of duration, bytes, etc.

The service or the application may be provided (block 420). For example, as previously described, the network (e.g., application server 240) may provide the requested application or service to the customer.

Real-time usage information may be generated based on real-time usage tracking (block 425). For example, as previously described, the network (e.g., application server 240) may track the real-time usage of the application or the service. The real-time usage tracking may be based on the type of service or the type of application. For example, real-time usage tracking of text messaging may include a transaction-based tracking corresponding to a mapping between the APN and the messaging service provided. The tracked usage data and/or information may be processed and real-time usage information may be generated.

Recommendation(s) may be generated based on the real-time usage information (block 430). For example, as previously described, MF 277 may be provided with the real-time usage information. MF 277 may generate recommendation(s) based on the real-time usage information. The recommendation(s) may include, for example, real-time usage information, recommendation(s) pertaining to available service plans, service control options, etc., as previously described. For example, the recommendation(s) may include a recommendation pertaining to an upgrade in service, a downgrade in service, overage management, blocking, etc.

The recommendation(s) may be sent to the customer (block 435). For example, as previously described, MF 277 may send the recommendation(s) to the customer using one or multiple forms of communication.

Referring to FIG. 4B, the customer's selection of one of the recommendation(s) may be received (block 440). For example, as previously described, the customer may select one of the recommendation(s) via the user device. The customer's selection may be sent to the network.

The service or the application may be provided according to the selected recommendation (block 445). For example, as previously described, the network may provision the customer's selection so that the service or the application may be provided to the customer in accordance with the customer's selection.

Although FIGS. 4A and 4B illustrate an exemplary process 400, according to other embodiments, process 400 may include additional operations, fewer operations, and/or different operations than those illustrated in FIGS. 4A and 4B and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The term "real-time usage information," as used herein, is intended to be broadly interpreted to include, for example, information pertaining to usage of an application or a service. For example, real-time usage information may include information pertaining to duration, data amount, number of messages or transactions, monetary balance, or other usage metrics related to the service or the application.

The term "application delivery control information," as used herein, is intended to be broadly interpreted to include, for example, information pertaining to the delivery of an application or a service. For example, the application delivery control information may include information pertaining to traffic management, load-balancing, routing, and/or quality-of-service related to the service or the application.

The term "real-time usage control policies," as used herein, is intended to be broadly interpreted to include, for example, policies that govern usage of a service or an application.

The term "application delivery control policies," as used herein, is intended to be broadly interpreted to include, for example, policies that govern the delivery of a service or an application.

In addition, while a series of blocks have been described with regard to the process illustrated in FIGS. 4A and 4B, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software or firmware executed by hardware. For example, a process or a function may be implemented as "logic" or as a "component." The logic or the component may include, for example, hardware (e.g., processing system 305, etc.), a combination of hardware and software (e.g., applications 315), a combination of hardware and firmware, or a combination of hardware, software, and firmware. The implementation of software or firmware has been described without reference to the specific software code since software can be designed to implement the embodiments based on the description herein. Additionally, a computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method performed by a network device, the method comprising:
   receiving, at the network device, a request for a service or an application from a user device associated with a current service plan for a customer;
   determining, by the network device, a type of service or a type of application;
   establishing, by the network device, a communication session with the user device for providing, under the current service plan, access to the service based on a service usage limit or the application based on an application delivery limit;
   performing, during the communication session, real-time tracking of a current usage of the service or the application based on the type of service or the type of application;
   determining, during the communication session and based on the real-time tracking, that the current usage is approaching the service usage limit or the current usage of the application is approaching the application delivery limit;

identifying, during the communication session and based on the approaching limit, one or more recommendations pertaining to service control options for real-time control of further access to the service or the application under the current service plan;

providing, via a user interface during the communication session, the one or more recommendations to the customer via the user device;

receiving, during the communication session and via the user interface in response to the one or more recommendations, customer changes to or configuration of the current service plan with respect to one or more of:
location-specific delivery or usage controls,
time of day-specific or day of week-specific delivery or usage controls,
content-specific delivery or usage controls, or
party-specific delivery or usage controls; and providing the real-time control of the further access to the service or the application in accordance with the customer's changes to or configuration of the current service plan.

2. The method of claim 1, wherein identifying the one or more recommendations includes identifying one or more recommendations further pertaining to one or more service plans different from the current service plan.

3. The method of claim 1, wherein the user interface further enables the customer to change or configure the current service plan with respect to managing an overage.

4. The method of claim 1, further comprising:
providing the real-time control of the further access to the service or the application in accordance with the customer's change to or configuration of the current service plan.

5. The method of claim 4, further comprising:
providing real-time changes to billing of the current usage of the service or the application in accordance with the customer's change to or configuration of the current service plan.

6. The method of claim 1, wherein when the service includes one of a mobile service, a telephone service, or an Internet service, providing the one or more recommendations includes providing real-time usage information indicative of the current usage.

7. The method of claim 1, further comprising:
generating real-time usage information, indicative of the current usage, based on the real-time tracking; and
selecting one or more of the service control options applicable to the current usage based on the real time usage information, and wherein providing the one or more recommendations includes providing the one or more of the service control options.

8. The method of claim 1, wherein determining the type of service or the type of application includes determining one of a duration type, a data amount type, or a number of messages type.

9. A network device comprising:
a communication interface including a transmitter and a receiver;
a memory storing instructions; and
one or more processors that execute the instructions to:
receive, via the communication interface, a request for a service or an application from a user device associated with a current service plan for a customer;
establish, via the communication interface, a communication session with the user device for providing, under the current service plan, access to the service based on a service usage limit or the application based on an application delivery limit;
perform, during the communication session, real-time tracking of current usage of the service or the application;
determine, during the communication session and based on the real-time tracking, that the current usage is approaching the service usage limit or the current usage of the application is approaching the application delivery limit;
identify, during the communication session and based on the approaching limit, one or more pertaining to service control options for real-time controlling of further access to the service or the application under the current service plan;
provide, via a user interface during the communication session, the one or more recommendations to the customer via the user device;
receive, during the communication session and via the user interface in response to the one or more recommendations, customer changes to or configuration of the current service plan with respect to one or more of:
location-specific delivery or usage controls,
time of day-specific or day of week-specific delivery or usage controls,
content-specific delivery or usage controls, or
party-specific delivery or usage controls; and
provide the real-time controlling of the further access to the service or the application in accordance with the customer's changes to or configuration of the current service plan.

10. The network device of claim 9, wherein the one or more processors further execute the instructions to:
provide real-time changes to billing of the current usage of the service or the application in accordance with the customer's change to or configuration of the current service plan.

11. The network device of claim 9, wherein the one or more processors further execute the instructions to:
identify at least one of the service control options to recommend to the customer based on real-time usage information and marketing information; and
calculate balance information pertaining to the current usage of the service or the application.

12. The network device of claim 9, wherein the network device resides in a Long Term Evolution network.

13. The network device of claim 10, wherein the one or more processors further execute the instructions to:
provide real-time updates to the network device in accordance with the customer's change or configuration of the current service plan.

14. The network device of claim 9, wherein the request for the service includes a request for mobile service or Internet service.

15. A non-transitory computer-readable storage device comprising executable instructions for execution by at least one processing system, wherein the executable instructions comprise instructions to:
receive a customer's request for a service or an application associated with a current service plan;

establish a communication session with a user device for providing, under the current service plan, access to the service or the application based on current usage or delivery controls;

perform, during the communication session, real-time tracking of a current usage of the service or the application;

generate, during the communication session, one or more recommendations pertaining to options for changing the current usage or delivery controls for providing real-time control of further access to the service or the application under the current service plan based on the real-time tracking;

provide, via a user interface during the communication session, the one or more recommendations to the customer via the user device associated with the customer;

receive, during the communication session and via the user interface in response to the one or more recommendations, customer selection of one or more of:
 location-specific usage or delivery controls,
 time of day-specific or day of week-specific delivery or usage controls,
 content-specific delivery or usage controls, or
 party-specific delivery or usage controls; and provide the real-time control of the further access to the service or the application in accordance with the customer's selection.

16. The non-transitory computer-readable storage device of claim 15, wherein the executable instructions further comprise instructions to:
 identify at least one of the one or more delivery or usage controls to recommend to the customer based on real-time usage information and marketing information.

17. The non-transitory computer-readable storage device of claim 15, wherein the executable instructions further comprise instructions to:
 implement real-time updates to the current usage or delivery controls in accordance with the customer's selection.

* * * * *